US007706394B2

(12) United States Patent
Blanc et al.

(10) Patent No.: US 7,706,394 B2
(45) Date of Patent: Apr. 27, 2010

(54) SYSTEM AND METHOD FOR COLLAPSING VOQ'S OF A PACKET SWITCH FABRIC

(75) Inventors: Alain Blanc, Tourrettes sur Loop (FR); Rene Glaise, Nice (FR); Francois Le Maut, Nice (FR); Michel Poret, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 1549 days.

(21) Appl. No.: 10/894,582

(22) Filed: Jul. 20, 2004

(65) Prior Publication Data

US 2005/0053077 A1 Mar. 10, 2005

(30) Foreign Application Priority Data

Jul. 23, 2003 (EP) ................................ 03368073

(51) Int. Cl.
*H04L 12/28* (2006.01)
*H04L 12/54* (2006.01)

(52) U.S. Cl. ..................... 370/428; 370/412; 370/395.1

(58) Field of Classification Search ................. 370/389, 370/355, 388, 392, 394, 395.1, 396, 395.4, 370/428, 412

See application file for complete search history.

(56) References Cited

U.S. PATENT DOCUMENTS

| 6,667,984 | B1 * | 12/2003 | Chao et al. ................ 370/414 |
| 6,757,246 | B2 * | 6/2004 | Alasti et al. ................ 370/230 |
| 6,760,303 | B1 * | 7/2004 | Brouwer ..................... 370/229 |
| 6,944,170 | B2 * | 9/2005 | Minkenberg ................ 370/411 |
| 7,023,857 | B1 * | 4/2006 | Chiussi et al. ........... 370/395.4 |
| 7,050,440 | B2 * | 5/2006 | Colmant et al. .......... 370/395.1 |
| 7,054,802 | B2 * | 5/2006 | Ohkami ...................... 703/15 |
| 7,120,160 | B2 * | 10/2006 | Takase et al. ............... 370/415 |

(Continued)

OTHER PUBLICATIONS

Wang et al. ("A Distributed Switch Architecture with Dynamic Load-balancing and Parallel Input-Queued Crossbars for Terabit Switch Fabrics") INFOCOM 2002. Twenty-First Annual Joint Conference of the IEEE Computer and Communications Societies. Proceedings. IEEE vol. 1, Jun. 23-27, 2002 pp. 352-361 vol. 1.*

*Primary Examiner*—Aung S Moe
*Assistant Examiner*—Awet Haile
(74) *Attorney, Agent, or Firm*—Dillon & Yudell LLP (57) ABSTRACT

A system and a method to avoid packet traffic congestion in a shared-memory switch core, while dramatically reducing the amount of shared memory in the switch core and the associated egress buffers, is disclosed. According to the invention, the virtual output queuing (VOQ) of all ingress adapters of a packet switch fabric are collapsed into its central switch core to allow an efficient flow control. The transmission of packets from an ingress buffer to the switch core is subject to a mechanism of request/acknowledgment. Therefore, a packet is transmitted from a virtual output queue to the shared-memory switch core only if the switch core can actually forward it to the corresponding egress buffer. A token based mechanism allows the switch core to determine the egress buffer's level of occupation. Therefore, since the switch core knows the states of the input and output adapters, it is able to optimize packet switching and to avoid packet congestion. Furthermore, since a packet is admitted in the switch core only if it can be transmitted to the corresponding egress buffer, the shared memory is reduced.

18 Claims, 7 Drawing Sheets

U.S. PATENT DOCUMENTS

| | | |
|---|---|---|
| 7,142,555 B2 * | 11/2006 | Wang .......................... 370/429 |
| 7,289,523 B2 * | 10/2007 | Glaise et al. ................. 370/413 |
| 7,339,944 B2 * | 3/2008 | Vandenhoudt et al. ...... 370/419 |
| 7,391,786 B1 * | 6/2008 | Prasad et al. ................ 370/412 |
| 2004/0085979 A1 * | 5/2004 | Lee et al. ..................... 370/412 |
| 2004/0100980 A1 * | 5/2004 | Jacobs et al. ................. 370/412 |
| 2004/0151197 A1 * | 8/2004 | Hui ............................. 370/412 |
| 2006/0120286 A1 * | 6/2006 | Fan et al. ................. 370/230.1 |

* cited by examiner

Prior Art

SYSTEM AND METHOD FOR COLLAPSING VOQ'S OF A PACKET SWITCH FABRIC

CROSS REFERENCE TO RELATED PATENT APPLICATIONS

The following patent applications are related to the subject matter of the present application and are assigned to common assignee:

1. U.S. patent application Ser. No. 10/894,681, Alain Blanc et al., "Algorithm and System for Selecting Acknowledgments from an Array of Collapsed VOQ's", filed concurrently herewith for the same inventive entity;

2. U.S. patent application Ser. No. 10/895,159, Alain Blanc, et al., "System and Method for Handling Multicast Traffic in a Shared Buffer Switch Core Collapsing Ingress VOQ's", filed concurrently herewith for the same inventive entity.

The above applications are incorporated herein by reference.

FIELD OF THE INVENTION

The present invention relates to high speed switching of data packets in general and, is more particularly concerned with a system and a method that permit to collapse the virtual output queuing (VOQ) of all ingress adapters of a packet switch fabric into its central switch core to allow an efficient flow control.

BACKGROUND OF THE INVENTION

The explosive demand for bandwidth over all sorts of communications networks has driven the development of very high-speed switch fabric devices. Those devices have allowed the practical implementation of network nodes capable of handling aggregate data traffic in a large range of values i.e., with throughputs from a few gigabit ($10^9$) to multi-terabit ($10^{12}$) per second. To carry out switching at network nodes, today's preferred solution is to employ, irrespective of the higher communications protocols actually in use to link the end-users, fixed-size packet (or cell) switching devices. These devices, which are said to be protocol agnostic, are considered to be simpler and more easily tunable for performances than other solutions especially, those handling variable-length packets. Thus, N×N switch fabrics, which can be viewed as black boxes with N inputs and N outputs, have been made capable of moving short fixed-size packets (typically 64-byte packets) from any incoming link to any outgoing link. Hence, communications protocol packets and frames need to be segmented in fixed-size packets while being routed at a network node. Although short fixed-size packet switches are thus often preferred, the segmentation and subsequent necessary reassembly (SAR) they assume have a cost. Switch fabrics that handle variable-size packets are thus also available. They are designed so that they do not require or limit the amount of SAR needed to route higher protocol frames.

Whichever type of packet switch is considered they have however in common the need of an efficient flow control mechanism which must attempt to prevent all forms of congestion. To this end, all modern packet switches use a scheme referred to as 'virtual output queuing' or VOQ. As sketched in FIG. 1, all ingress port adapters or IA's (100) to a switch core (110) are temporarily storing incoming packets (105) in a 'first come first served' or FCFS order, generally in the form of linked list of packets (120) however, sorted on a per destination basis and more generally on a per flow basis (125). Depending on the type of application considered, flows can have to be differentiated not only by their destinations but also according to priorities or 'class of service' (CoS) and possibly according to other traffic characteristics such as of being a multicast (MC) flow of packets that must be replicated to be forwarded to multiple destinations as opposed to unicast (UC) flows. Hence, flows are differentiated with flow-ID's which include destinations and possibly many more parameters especially, a CoS.

Figure 1:
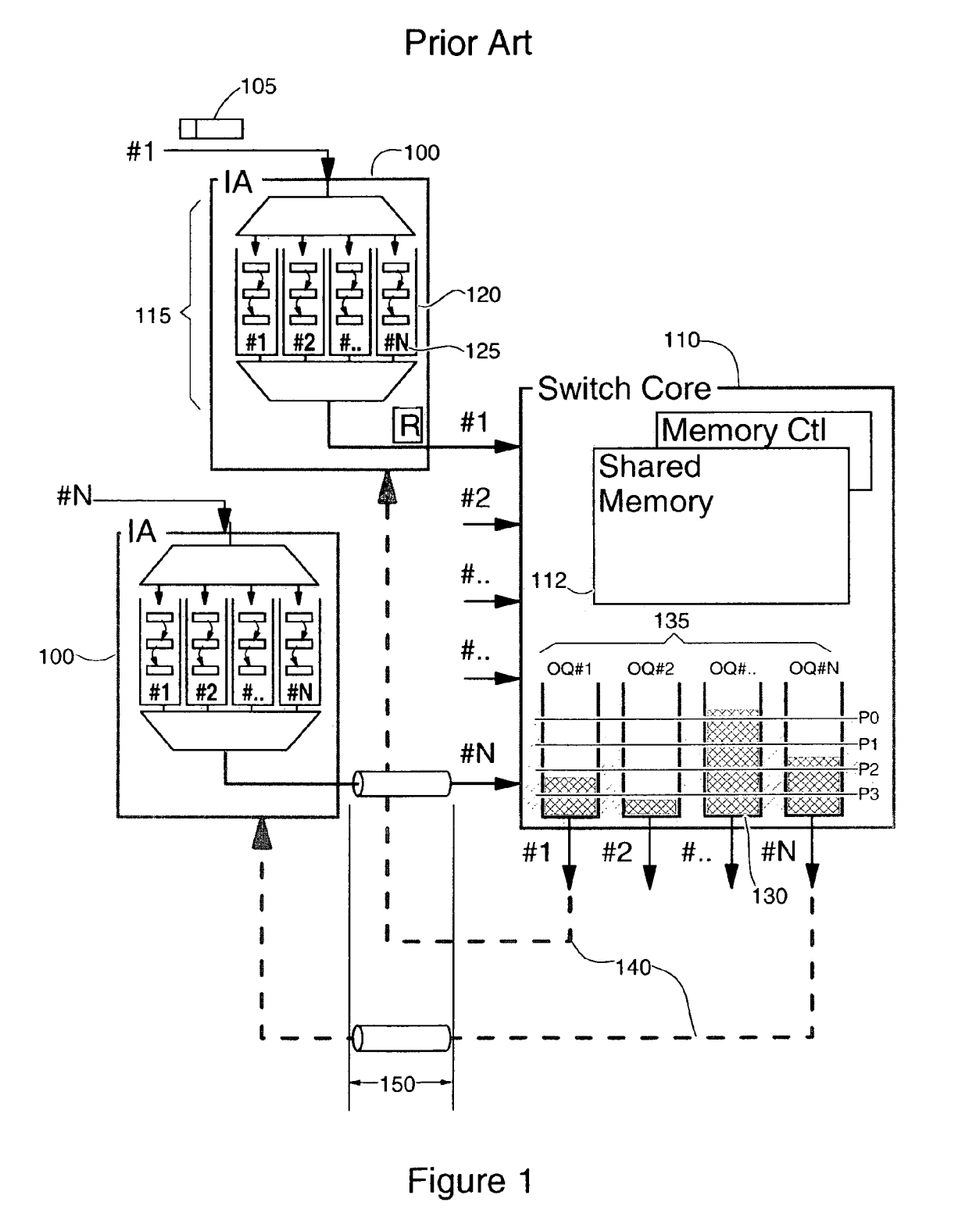
FIG. 1 shows a shared-memory switch core equipped with port OQ's whose filling is monitored so as incoming packets can be held in VOQ's to prevent output congestion to occur.

Organizing input queuing as a VOQ has the great advantage of preventing any form of 'head of line' or HoL blocking. HoL blocking is potentially encountered each time incoming traffic, on one input port, has a packet destined for a busy output port, and which cannot be admitted in the switch core, because flow control mechanism has determined it is better to do so e.g., to prevent an output queue (OQ) such as (130) from over filling. Hence, other packets waiting in line are also blocked since, even though they would be destined for an idle output port, they just cannot enter the switch core. To prevent this from ever occurring, IA's input queuing is organized as a VOQ (115). Incoming traffic on each input port i.e., in each IA, is sorted per port destination (125) and in general per class of service or flow-ID, so that if an output port is experiencing congestion, traffic for other ports, if any, can be selected instead thus, has not to wait in line.

This important scheme of switch fabrics which authorizes input queuing without its drawback i.e., HoL blocking, was first introduced by Y. Tamir and G. Frazier, "High performance multi-queue buffers for VLSI communication switches," in Proc. 15th Annu. Symp. Comput. Arch., June 1988, pp. 343-354. It is universally used in all kinds of switch fabrics that rely on input-queuing and is described, or simply assumed, in numerous publications dealing with this subject. As an example, a description of the use of VOQ and of its advantages can be found in "The iSLIP Scheduling Algorithm for Input-Queued Switches" by Nick McKeown, IEEE/ACM TRANSACTIONS ON NETWORKING, VOL. 7, NO. 2, April 1999.

The implementation of a packet switching function brings a difficult challenge which is the overall control of all the flows of data entering and leaving it. Whichever method is adopted for flow control, this always assumes that packets can be temporarily held at various stages of the switching function so as to handle flows on a priority basis thus supporting QoS (Quality of Service) and preventing switch to get congested. VOQ scheme fits well with this, allowing packets to be preferably held in input queues i.e., in IA's (100), before entering the switch core (110) while not introducing any blocking of higher priority flows.

As an example of this, FIG. 1 shows a shared-memory switch core (112) equipped with port OQ's (135) whose filling is monitored so as incoming packets can be held in VOQ's to prevent output congestion to occur. To prevent OQ's from ever overflowing, packets are no longer admitted when an output congestion is detected. Congestion occurs because too much traffic, destined for one output port or a set of output ports, is entering the switch core. As an elementary example of this one may consider two input ports each receiving 75% of their full traffic destined for a same given output port. This latter can only drain 100% of the corresponding traffic (ports IN and OUT typically, have identical speed) thus, the traffic in excess (50%) must be stored in the shared-memory and starts to build-up. If congestion lasts, and if nothing is done, the shared-memory fills up and the related OQ (130) soon overflows. Therefore, all OQ's are watched so as, if they tend to fill up, a feedback mechanism (140) prevents packets for a congested switch core output from leaving the corresponding VOQ's of IA's. This is easily achieved since VOQ's, in each ingress IA, are organized per destination as discussed above. Obviously, this is done on a priority basis i.e., lower priority packets are held first (although, for a sake of clarity, this is not shown in FIG. 1, VOQ's are organized per priority too) according to a series of thresholds (145) associated to the set of OQ's (135).

This scheme works well as long as the time to feed the information back to the source of traffic i.e., the VOQ's of IA's (100), is short when expressed in packet-times. However, packet-time reduces dramatically in the most recent implementation of switch fabrics where the demand for performance is such that aggregate throughput must be expressed in tera ($10^{12}$) bits per second. As an example, packet-time can be as low as 8 ns (nanoseconds i.e.: $10^{-9}$ sec.) for 64-byte packets received on OC-768 or 40 Gbps ($10^9$ bps) switch port having a 1.6 speedup factor thus, actually operating at 64 Gbps. As a consequence, round trip time (RTT) of the flow control information is far from being negligible as this used to be the case with lower speed ports. As an example of a worst case traffic scenario, all input ports of a 64-port switch may have to forward packets to the same output port eventually creating a hot spot. It will take RTT time to detect and block the incoming traffic in all VOQ's involved. If RTT is e.g.: 16 packet-times then, 64×16=1024 packets may have to accumulate for the same output in the switch core. A RTT of 16 packet-times corresponds to the case where, for practical considerations and mainly because of packaging constraints, distribution of power, reliability and maintainability of a large system, port adapters cannot be located in the same shelf and have to interface with the switch core ports through cables. Then, if cables (150) are 10 meter long, because light is traveling at 5 nanoseconds per meter, it takes 100 nanoseconds or about 12 8-ns packet-times to go twice through the cables. Then, adding the internal processing time of the electronic boards, including the multi-Gbps serializer/deserializer (SERDES), this may easily add up to the 16 packet-times used in the above example.

Hence, when the performance of a large switching equipment approaches or crosses the 1 Tbps level, typically with 40 Gbps (OC-768) ports, RTT expressed in packet-time is becoming too high to continue to use a standard or back-pressure flow control mechanism such as the ones briefly discussed in FIG. 1. Because this type of flow control assumes that all IA's, independently, keep forwarding traffic to the switch core, and relies on the feedback (140) of flow control information to stop sending if a congestion is detected clearly, the reaction time becomes too high. When a congestion is detected, by the time it is reported to the sources, the situation may have dramatically worsen up to a point where it is no longer containable forcing to discard packets especially, if for an extended period of time, the traffic is biased to a single or a few output ports (hot spot).

SUMMARY OF THE INVENTION

Thus, it is a broad object of the invention to remedy the shortcomings of the prior art as described here above.

It is another object of the invention to provide a system and a method to prevent any form of packet traffic congestion in a shared-memory switch core.

It is a further object of the invention to permit that an absolute upper bound on the size of the shared-memory, necessary to achieve this congestion-free mode of operation, be definable irrespective of any incoming traffic type.

It is still another object of the invention to further reduce the above necessary amount of shared-memory of the switch core, while maintaining a congestion-free operation and without impacting performances, by controlling the filling of the shared-memory and keep data packets flowing up to the egress port adapter buffers.

The accomplishment of these and other related objects is achieved by a method for switching data packets in a shared-memory switch core, from a plurality of ingress port adapters to a plurality of egress port adapters, each of said ingress port adapters including an ingress buffer comprising at least one virtual output queue per egress port to hold incoming data packets, each of said ingress port adapters being adapted to send a transmission request each time a data packet is received, to store said data packet, and to send a data packet referenced by a virtual output queue when an acknowledgment corresponding to said virtual output queue is received, said method comprising updating, in said switch core, a collapsed virtual output queuing array characterizing the filling of each of said virtual output queues upon reception of transmission requests;

selecting a set of one virtual output queue per ingress port adapter holding at least one data packet on the basis of said collapsed virtual output queuing array;

updating said collapsed virtual output queuing array according to said virtual output queue selection;

transmitting an acknowledgment to said selected virtual output queues;

forwarding received data packets to relevant egress port adapters upon reception of said data packets in said shared-memory switch core.

Further advantages of the present invention will become apparent to the ones skilled in the art upon examination of the drawings and detailed description. It is intended that any additional advantages be incorporated herein.

DETAILED DESCRIPTION OF THE PREFERRED EMBODIMENT

Figure 2:
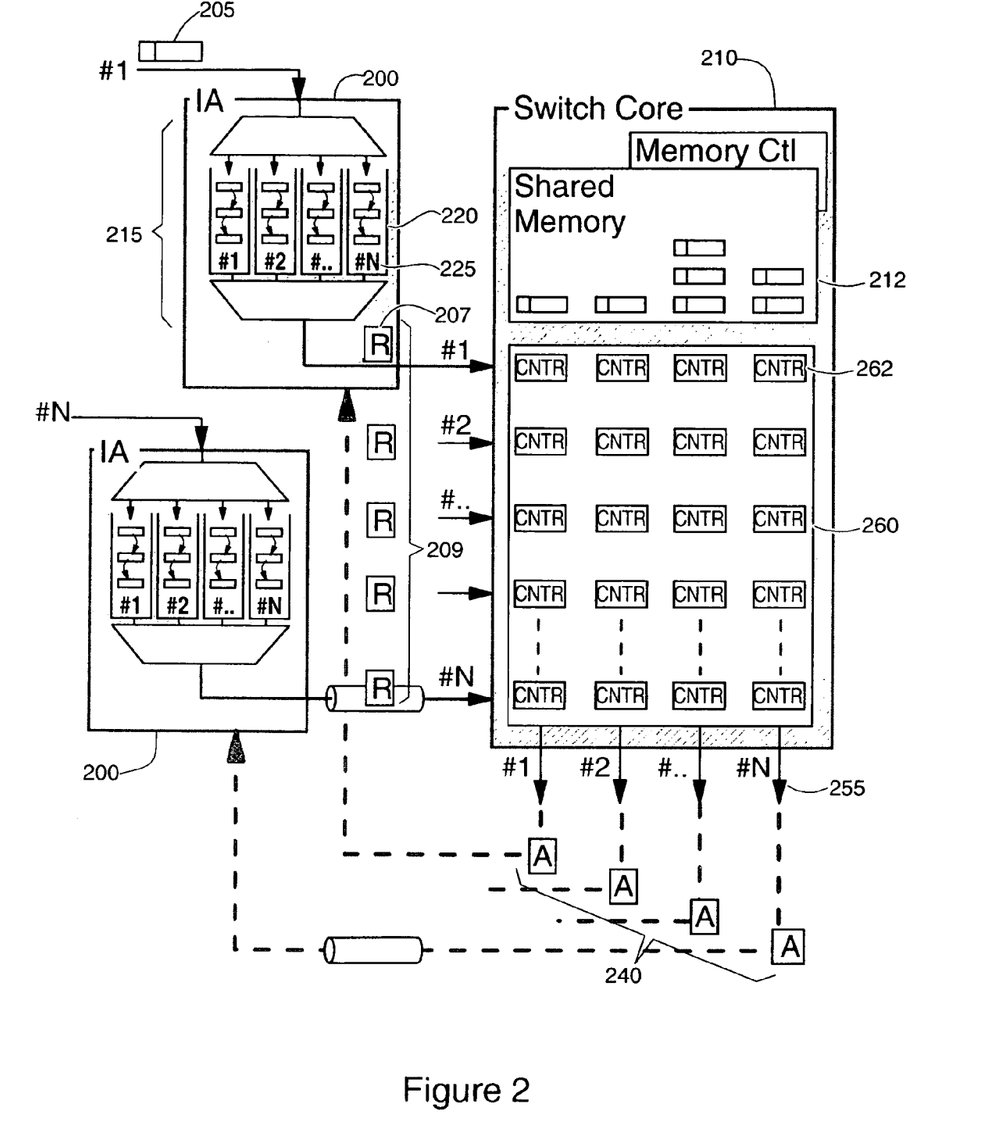
FIG. 2 illustrates the new principle of operation according to the invention.

FIG. 2 illustrates the new principle of operation according to the invention.

Instead of relying on a feedback from switch core (210) to stop forwarding traffic in case of congestion, thus carrying out a back-pressure mechanism, the invention assumes that for each received packet (205), in every IA (200), a request (207) is immediately forwarded to the switch core. As in prior art, the just received packet is queued at the tail of the input queue to which it belongs e.g., (220). Input queues are still organized to form a VOQ (215) per destination as shown (225) and, in general, per class of service (CoS) or flow-ID. As already briefly discussed in the background section, the type of packet-switch considered by the invention assumes that each received packet belongs to a flow allowing to implement a CoS scheme. In the same way HoL blocking may occur because a destination is busy (if packets were not queued by destination), a low priority packet must not stay on the way of a higher priority packet for a same destination. Hence, to avoid priority blocking, VOQ's are most often organized by priority too. That is, there are as many input queues in a VOQ like (215) as there are destinations and priorities to be handled. As an example, a 64 port switch supporting 8 classes of traffic has 64×8=512 queues in each VOQ of IA's (200). More queues may exist if there are other criterions to consider. This is especially the case of the multicast (MC) traffic, i.e., traffic for multiple destinations that generally deserve to have dedicated queues too (also organized by priority). Hence, if for a sake of clarity only destination (225) is shown in FIG. 2 as being the only criterion to organize a VOQ it must be understood that, in general, there are as many queues as there are flows to consider so as no HoL blocking may possibly occur between independent flows.

Therefore, sending a request (207) to switch core for each arriving packet allows to keep track of the state of all VOQ's within a switch fabric. This is done e.g., under the form of an array of counters (260). Each individual counter (262) is the counterpart of an IA queue like (220). On reception by switch core of a request, that carries the reference of the queue to which it belongs in IA (200), the corresponding counter (262) is incremented so as to record how many packets are currently waiting to be switched. This process occurs simultaneously, at each packet cycle, from all IA's (209) that have received a packet (205). There is thus possibly up to one request per input port at every packet cycle to be processed. As a consequence of above, the array of counters (260) collapses the information of all VOQ's i.e., from all IA's, in a single place. Hence, switch core gains a complete view of the incoming traffic to the switch fabric.

Collapsing all VOQ's in switch core, that is implementing a collapsed virtual output queuing array (cVOQ), allows to selectively return acknowledgments (240) to all IA's that have at least one non-empty queue, so as to authorize the forwarding of incoming data packets temporarily stored in VOQ's. On reception of an acknowledgment, IA's may unconditionally forward the corresponding waiting packets e.g., to a shared memory (212) as in previous art from where they will exit the switch core through one (UC flows) or more (MC flows) output ports to an egress adapter (not shown). Issuing acknowledgments from switch core, eventually triggering the sending of a packet from an IA, allow to decrement the corresponding counter so as to keep IA's VOQ and collapsed switch core VOQ, to be in synch. Hence, because all information is now available in a single place, the collapsed VOQ's in the switch core referred to as cVOQ in the following description, a comprehensive choice can be exercised on what is best to return to IA's at each packet cycle to prevent switch core to become congested and shared memory to overflow thus, maintaining in ingress queues the packets that cannot be scheduled to be switched.

This mode of operation is to compare with the flow control of the previous art (FIG. 1) where each IA is acting independently of all the others. In this case, a choice of the next best packet to forward can only be performed on the basis of the local waiting packets resulting in the forwarding to switch core of packets that cannot actually be switched because there are priority flows, from the other IA's, to be handled first. Although the back-pressure mechanism of the previous art eventually manages to stop sending traffic that cannot be forwarded by the switch core, the reaction time in terabit-class switches is becoming much too high, when expressed in packet-times, to be effective e.g., to keep the amount of necessary shared memory to a level compatible with what can be integrated in a chip. On the contrary, the new mode of operation assumes that requests are sent, instead of real packets, on which the switch core is acting first to decide what it can actually process at any given instant.

It is worth noting here that the invention rests on the assumption that an unrestricted amount of requests (in lieu of real packets) can be forwarded to the switch core thus, without necessitating a back-pressure on the requests. This is indeed feasible since counters are used for requests instead of real memory to store packets. Doubling the size of a counter requires only one more bit to be added while this requires to double the size of the memory if packets were admitted in switch core as it is the case with a back-pressure mode of operation. Hence, because hardware resources needed to implement the new mode of operation grows only as the logarithm of the number of requests to handle, this is indeed feasible. On a practical point of view, each cVOQ individual counter should be large enough to count the total number of packets that can be admitted in an ingress adapter. This takes care of the worst case where all waiting packets belongs to a single queue. Typically, ingress adapters are designed to hold each a few thousand packets. For example, 12-bit (4 k) counters may be needed in this case. There are other considerations to limit the size of the counters like the maximum number of packets to be admitted in IA's for a same destination.

Figure 3:
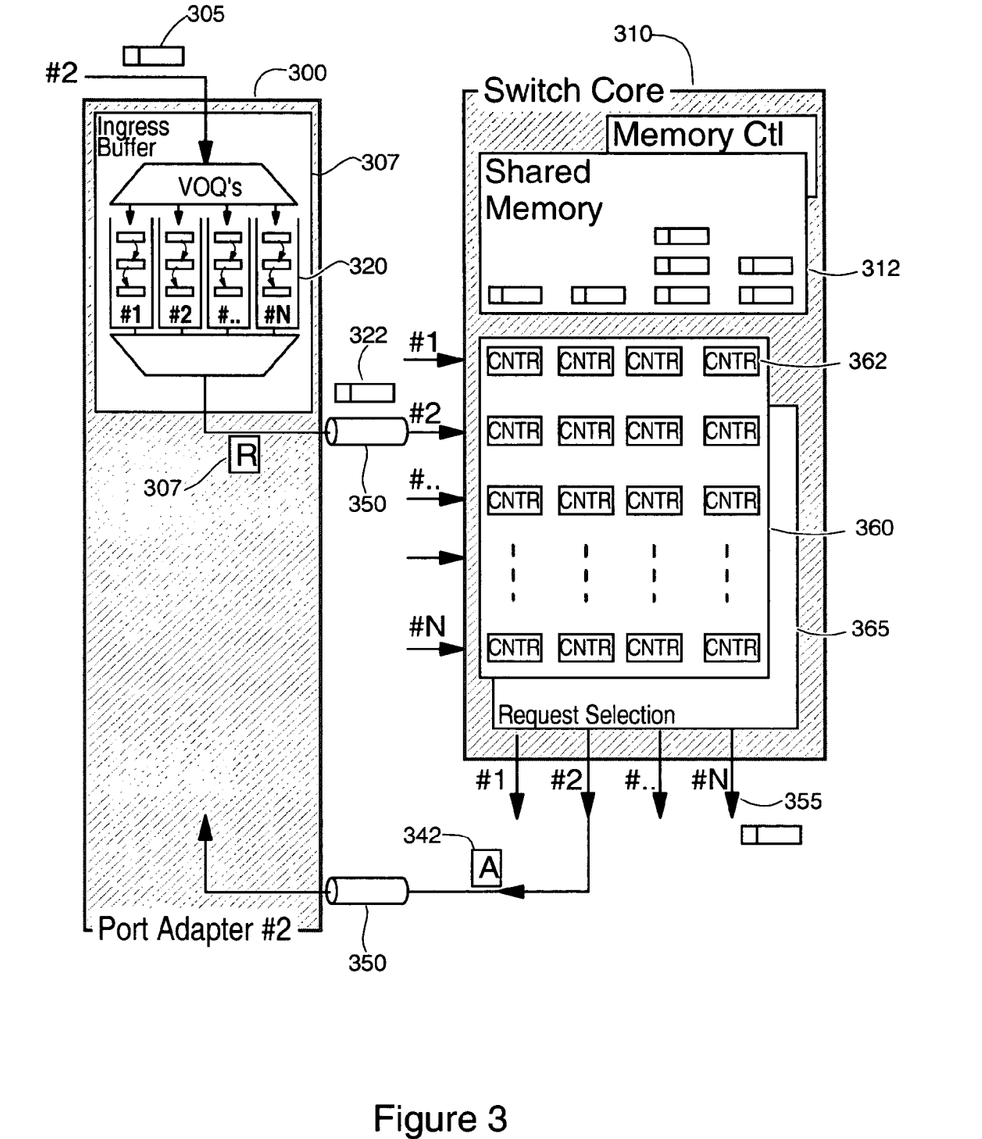
FIG. 3 further discusses the operation of a switch according to the invention.

FIG. 3 further discusses the operation of a switch according to the invention. For each packet (305) arriving through the input line of a port adapter e.g., the one tied to switch core (310) port #2 (300) it is stored in an ingress buffer (307) and appended to the tail of the queue it belongs to e.g., queue (320) if packet is destined for the Nth output port, so as it can later be retrieved from buffer and processed in the right order of arrival. Indeed, each queue is a linked list of pointers to the buffer locations where packets are temporarily stored. Techniques for forming queues and attributing and releasing packet buffers from a memory are well known from the art and are not otherwise discussed. The invention does not assume any particular scheme to store, retrieve and form the queues of packets.

Immediately upon arrival of packet a request (307) is issued to switch core (310). Request needs to travel through cable (350) and/or wiring on the electronic board(s) and backplane(s) used to implement the switching function. Adapter port to switch core link may also use one or more optical fibers in which case there may have also opto-electronic components on the way. Request eventually reaches the switch core so as this later is informed that one more packet is waiting in IA. In a preferred mode of implementation of the invention this results in the increment of a binary counter associated to the corresponding queue i.e., individual counter (362) part of the set of counters (360) that collapse all VOQ's of all ingress adapters as described in previous figure.

Then, the invention assumes there is a mechanism 365 in switch core (310) which selects which ones of pending requests should be acknowledged. No particular selection mechanism is assumed by the invention for determining which IA queues should be acknowledged first. This is highly dependent on a particular application and expected behavior of the switching function. Whichever algorithm is however used only one acknowledgment per output port, such as (342), can possibly be sent back to its respective IA at each packet cycle. Thus, algorithm should tend to always select one pending request per EA (if any is indeed pending for that output i.e., if at least one counter is different from zero) in cVOQ array (360) in order not to waste the bandwidth available for the sending of acknowledgments to the IA's. When several adapters have waiting packets for the same output (there are several non-zero counters in the column) it is always possible to exercise, in a column, the best choice e.g., to select the adapter which has the highest priority packet waiting to be switched. This must be compared to the back-pressure mode of operation of the previous art, described in FIG. 1, in which all individual IA's are authorized to push packets in the switch core irrespective of what is present in the other adapters.

Acknowledgments, such as (342), are thus for a given output port and more generally are defined on a per flow basis as already discussed earlier. As a consequence, an IA receiving such an acknowledgment unambiguously knows which one of the packets waiting in the buffer (307) should be forwarded to the switch core. It is the one situated at head of line of the queue referenced by the acknowledgment. The corresponding packet is thus retrieved in buffer and immediately forwarded (322). Because the switch core request selection process has a full view of all pending requests and also knows what resources remain available in the switch core no acknowledgment is sent back to an IA if the corresponding resources are exhausted. This translates, in a shared memory such as (312), by the fact that there must have enough room left before authorizing the forwarding of a corresponding acknowledgment. Also, in such a mode of operation, there is no need to bring into the switch core too many packets for a same output port. There must just have enough packets for every output port so that the switch is said to be work-conserving. In other words a maximum of RTT packets, per output, should be brought in shared-memory if the corresponding input traffic indeed permits it. This is sufficient to guarantee that packets can continuously flow out of any port so that no cycle is ever wasted (while one or more packets would be unnecessarily waiting to be processed in ingress adapter). RTT packets to be processed by each core output port leave enough time to send back an acknowledgment and receive a new packet on time. If, as in example of the background section, RTT is 16 packet-times and switch core has 64 ports the shared memory (312) needs to be able to hold a maximum of 64×16=1024 packets. Indeed, if no adapter is located more than 16 packet-times apart from switch core shared memory cannot overflow and a continuous flow of packets can always be sustained to a port receiving 100% of aggregate traffic from a single input port or in any mix of 1 to 64 ports in this example.

A consequence of the mode of operation according to the invention is that it takes always two RTTs to switch a packet (i.e.: 2×16×8=256 ns with 8-ns packets) because a request is first sent and actual packet only forwarded upon reception of an acknowledgment. Hence, this allows to control exactly the resources needed for implementing a switch core irrespective of any traffic scenario. As shown in above example the size of the shared memory is bounded by the back and forth travel time (RTT) between adapters and switch core and by the number of ports.

No packet is ever admitted in switch core unless it is guaranteed to be processed in RTT time.

Figure 4:
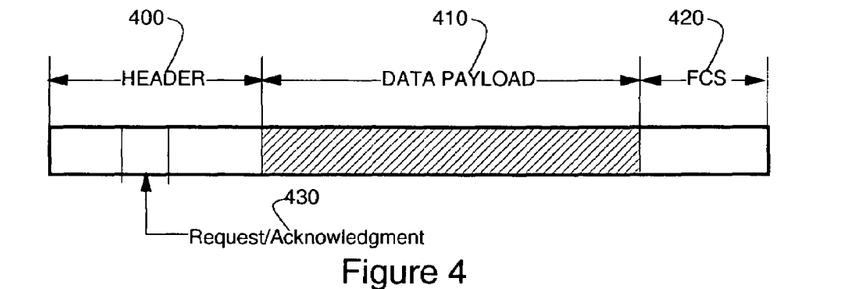
FIG. 4 briefly described how requests and acknowledgments necessary to operate a switch fabric according to the invention are exchanged between adapters and switch core.

FIG. 4 briefly described how requests and acknowledgments necessary to operate a switch fabric according to the invention and discussed in previous FIGS. 2 and 3 are exchanged between adapters and switch core.

Although many alternate ways are possible, including to have dedicated links and I/O's to this end, a preferred mode of implementation is to have the requests and acknowledgments carried in the header of the packets that are continuously exchanged between adapters and switch core (i.e., in-band). Indeed, in a switch fabric of the kind considered by the invention numerous high speed (multi-Gbps) links must be used to implement the port interfaces. Even though there is no traffic through a port at a given instant, to keep links in synch and running, idle packets are exchanged instead when there is no data to forward or to receive. Whichever packets are 'true' packets i.e., carrying user data, or are idle packets they are comprised of a header field (400) and a payload field (410) this later being significant, as data, in the user packet only. There is also, optionally, a trailing field (420) to check the packet after switching. This takes the form of a FCS (Field Check Sequence) generally implementing some sort of CRC (Cyclic Redundancy Checking) for checking packet content. Obviously idle packets are discarded in the destination device after the header information they carry is extracted.

Hence, there is a continuous flow of packets in both directions, idle or user packets, on all ports between adapters and switch core. Their headers can thus carry the requests and acknowledgments in a header sub-field e.g.: (430). Packets entering the switch core thus carry the requests from IA's while those leaving the switch core carry the acknowledgments back to IA's.

Packet header contains all the necessary information to process the current packet by the destination device (switch core or egress adapter discussed in next figure). Typically, this includes the destination port and the priority or CoS associated to the current packet and generally much more e.g., the fact that packet is a unicast or a multicast packet which implies a routing index or flow ID to be transported too. On the contrary of the rest of the header the Request/Acknowledgment sub-field (430) is foreign to the current packet and refers to a packet waiting in ingress adapter. Therefore, Request/Acknowledgment sub-field must unambiguously references the queue concerned by the request or acknowledgment such as (320) in FIG. 3.

As an example a packet destined for port N may carry a request for a packet destined for port #2. Thus, carrying packet can be any user packet or just an idle packet that will be discarded by the destination device after the information it carries has been extracted.

It is worth noting here that idle packets can optionally carry information not only in their headers but as well in the payload field (410) since they are not actually transporting any user data.

Figure 5:
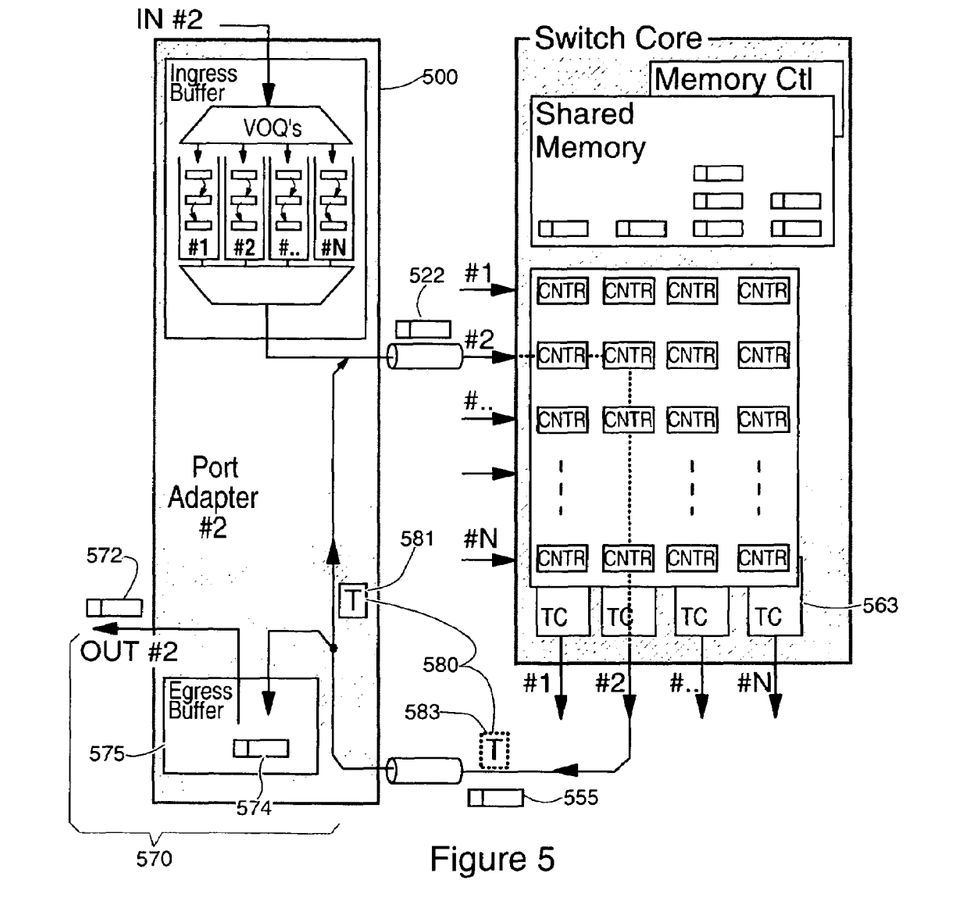
FIG. 5 discusses the egress part of each port adapter.

FIG. 5 discusses the egress part (570) of each port adapter (500) e.g., port adapter #2.

The invention assumes there is an egress buffer (575) in each egress adapter to temporarily hold (574) the packets to be transmitted. Egress buffer is a limited resource and its occupation must be controlled. The invention assumes that this is achieved by circulating tokens (580) between each egress adapter (570) and the corresponding switch core port. There is one token for each packet buffer space in the egress adapter. Hence, a token is released to switch core (581) each time a packet leaves an egress adapter (572) while one is consumed by switch core (583) each time it forwards a packet (555). In practice, tokens to the egress buffer (583), take the form of a counter in each egress port of the switch core (563).

Counter is decremented each time a packet is forwarded. Thus, in this direction, packet is also implicitly the token and has not to be otherwise materialized.

When a packet is released from egress buffer though, corresponding token counter (TC) such as (563) must be incremented since one buffer has been freed. In this case tokens like (581) materialize by updating a sub-field in the header of any packet entering switch through ingress port #2. Like with the Request/Acknowledgment sub-field shown in FIG. 4, in a preferred mode of implementation of the invention, there is also a sub-field (not explicitly shown in FIG. 4 however) dedicated to egress tokens in the header of each packet entering the switch core (522) so as the information can be extracted to increment the relevant TC's (563).

Therefore, switch core is always informed, at any given instant, in each egress port, of how many packet buffers are for sure unoccupied in the egress buffer adapters. Thus, at each packet cycle, it is possible to make a decision to forward, or not, a packet from switch core to egress adapter on the basis of TC values. Clearly, if a TC is greater than zero a packet can be forwarded since there is at least one buffer space left in that egress buffer (575).

As already observed with the requests, acknowledgments and packets, mainly because of the delay of propagation over cables and wiring and because of the internal processing time of the electronic boards, up to RTT tokens can be in fly. Hence, egress buffer must be able to hold RTT packets so as switch core can forward RTT packets thus, consuming all its tokens for a destination, before seeing the first token (581) returned just in time to keep sending packets to that destination if there is indeed a continuous traffic of packets to be forwarded.

Figure 6:
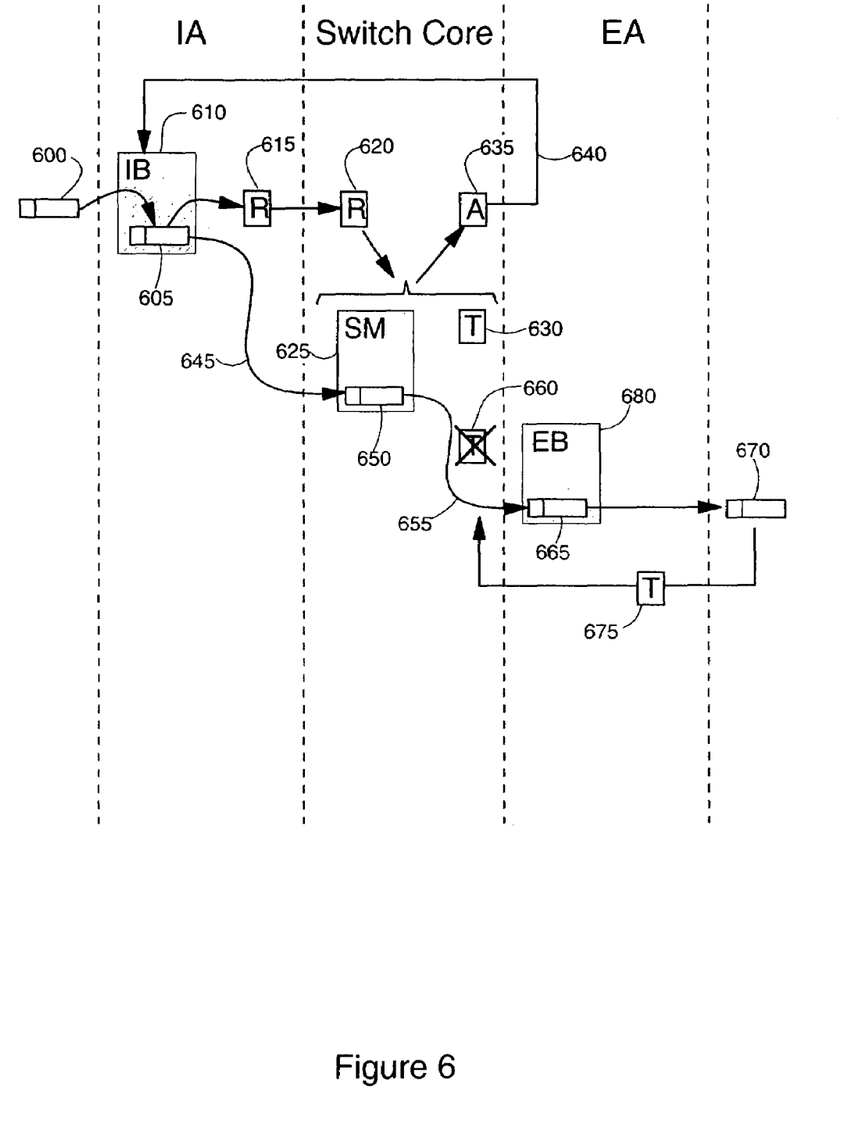
FIG. 6 discusses the interactions between requests, acknowledgments and egress tokens which allow to drastically limit the required amount of shared memory of the switch core and egress buffer while allowing a loss-less work-conserving flow of packets to be switched by a fabric according to the invention.

FIG. 6 discusses the interactions between requests, acknowledgments and egress tokens which allow to drastically limit the required amount of shared memory of the switch core and egress buffer while allowing a loss-less work-conserving flow of packets to be switched by a fabric according to the invention without having to make any assumption on traffic characteristics. In other words, contrary to switch fabrics implementing a back-pressure flow-control mechanism, no hot spot or congestion can possibly be observed in a switch core according to the invention since resources, adapted to a given number of ports and for a given RTT, can never be over subscribed. Obviously, traffic that cannot be admitted in switch core accumulates in the corresponding ingress adapters where an appropriate flow-control to the actual source of traffic must be eventually exercised. Overall process of a packet in a switch according to the invention is as follows.

A packet received in an ingress adapter (600) is unconditionally stored (605) in ingress buffer (610) (an upward flow-control to the actual source of traffic is assumed to not overfill the ingress buffer). The receiving of a packet immediately triggers the sending of a request (615). Request travels up to switch core (620) where filling of shared memory (625) and the availability of a token (630), for the egress port to which received packet is destined for, is checked. If both conditions are met i.e., if there is enough space available in shared memory and if there is one or more tokens left then, an acknowledgment (635) may be issued back to IA (640).

Upon reception of the acknowledgment IA forward unconditionally a packet (645) corresponding to the just received acknowledgment. It is important here to notice that there is no strict relationship between a given request, an acknowledgment and the packet which is forwarded. As explained earlier incoming packets are always queued per destination (VOQ), and also generally per CoS or flow, for which the acknowledgment (635) is issued thus, this is always the head-of-queue packet which is forwarded from IA so as no disordering in the delivery of packets is possibly introduced.

When forwarded packet is received in switch core it is queued to the corresponding egress port and sent to the egress buffer (680), in arrival order, consuming one token (660). If no token is available packet forwarding is momentarily stopped. So is the sending of acknowledgments back to the IA's having traffic for that destination. Already received packets wait in SM but no more are possibly admitted until tokens are returned (675) from the egress adapter as discussed in FIG. 5.

Once in egress buffer (680), the packet is queued for the output and leaves (670) egress adapter in arrival order or according to any policy enforced by the adapter. Generally, adapter is designed to forward high priority packets first. If the invention does not assume any particular algorithm or mechanism to select an outgoing packet, from the set of packets possibly waiting in egress buffer, it definitively assumes that a token is released (675) to the corresponding switch core egress port as soon as packet leaves egress adapter (670) so as token eventually becomes available to allow the moving of more packets first from IA to switch core then, from switch core to egress buffer.

At this point, it must be clear that in a switch core according to the invention, the shared memory size need not to be actually as large as the upper bound calculated in FIG. 3. Shared memory is actually made of the real buffering available in switch core plus the egress tokens (630) that represent memory space readily available in all egress buffers. Since packets are sent immediately to the corresponding egress adapters, as long as there are tokens available, shared memory may not really fills up. The size of the necessary shared memory can thus be further limited depending upon the chosen request selection algorithm discussed in FIG. 3 (365). If the algorithm is such that, at each packet cycle, no more than one packet per destination can be brought in switch core then, memory could be strictly limited to one packet per destination since it is guaranteed that all incoming packets can thus immediately be forwarded (provided at least one token is available in each egress port). This puts however severe constraints on the algorithm that become difficult to carry out especially, in large switches and at the speed considered.

Interestingly enough, this is what the well-known iSLIP algorithm (see earlier reference to iSLIP in the background section), devised for switch cores that use a crossbar, must accomplish. Hence, one possible request selection algorithm is iSLIP which allows to drastically limit the size of the shared memory in a switch fabric according to the invention.

The use of a shared-memory allows however to utilize a more efficient algorithm that tolerates the reception, at each cycle, of several packets for the same egress port (thus, from several ingress adapters) and that can be much more easily carried out at the speeds required by modern terabit-class switch fabrics considered by the invention. Any number between one and RTT packets, the maximum necessary as discussed in FIG. 3 (to stay work-conversing without having to rely on the egress tokens though), can thus be considered for the shared memory size. Whatever number is used the corresponding request selection algorithm must match the choice which is made.

As an example, if selection algorithm retained is able to limit to a maximum of four the number of packets selected at each cycle for a same destination then, shared memory for a 64-port switch needs to hold only 64×4=256 packets. Egress buffer must stick to the RTT rule though. That is, in each egress adapter one must have a 16-packet buffer, possibly per priority, if one needs to support a RTT of 16 packet-times. Ingress buffering size is only dependent of the flow-control between the ingress adapter and its actual source(s) of traffic.

Figure 7:
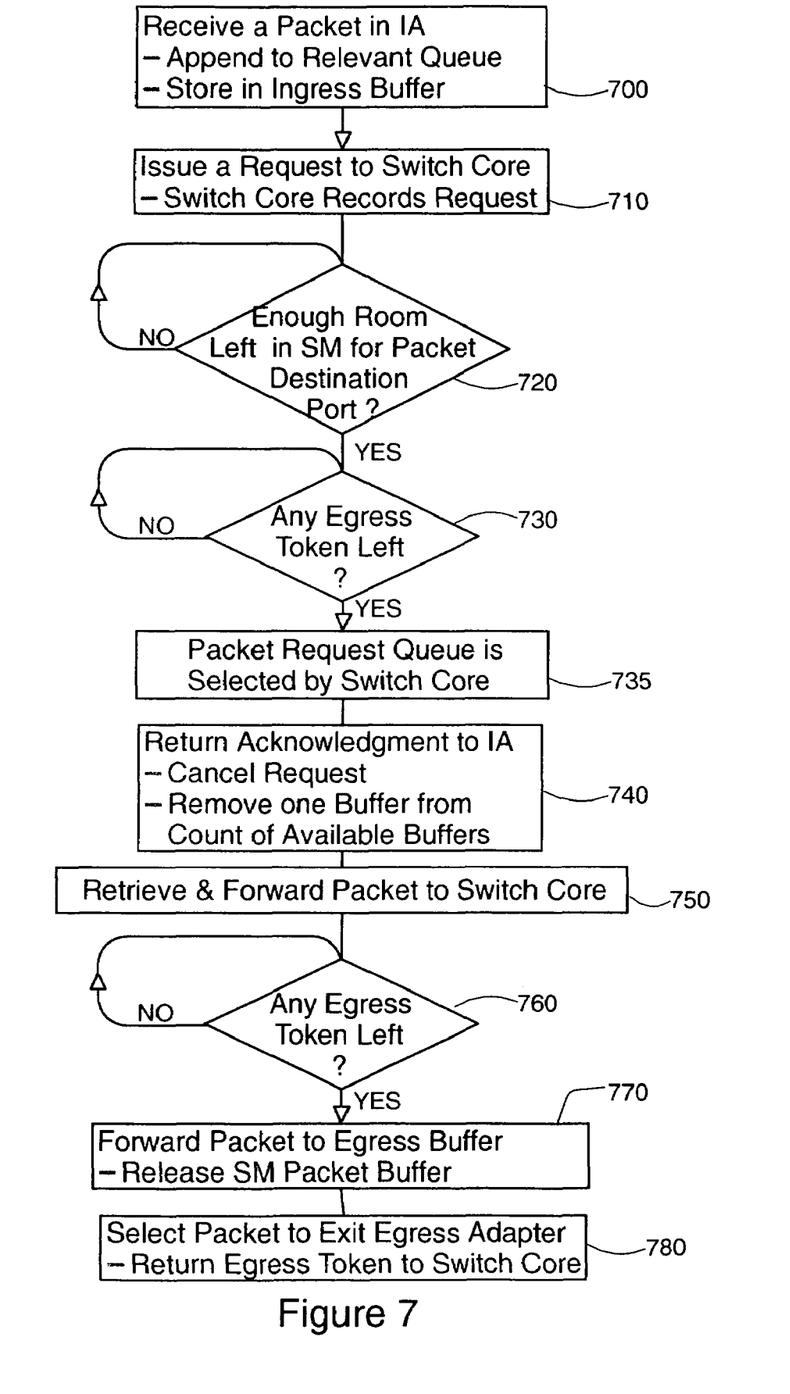
FIG. 7 describes the steps of the method to switch and forward packets in a switch fabric according to the invention.

FIG. 7 describes the steps of the method to switch and forward packets in a switch fabric according to the invention.

Whenever a data packet is received through the input port to a switch fabric (700) its header is examined. While packet is stored in ingress buffer an entry is made to the tail of the queue it belongs to in order it can later be retrieved. Then, a request, corresponding to the queue it has been appended to, is issued to the switch core (710) which records it in an array of pending requests (cVOQ), image of all the queues of all IA's connected to the switch core and described in FIG. 2. Switch core checks (720) if there is enough room left in its shared memory to receive one more packet for the port addressed by the request and if, at least, one egress token is available (730) for that port. If the answers are positive (721, 731) request can participate to the selection process by switch core within all pending requests in cVOQ array.

When queue to which request belongs is actually selected (735) an acknowledgment (740) is returned to the corresponding IA and request is immediately canceled since it has been honored. Simultaneously, a shared memory buffer space is reserved by removing one buffer from the count of available SM buffers (even though corresponding packet has not been received yet). In a preferred mode of implementation of the invention cancellation of the honored request just consists in decrementing the relevant individual counter in cVOQ array of request counters.

When acknowledgment reaches IA, packet is immediately retrieved and forwarded to switch core (750) where it can be unrestrictedly stored since space has been reserved when acknowledgment was issued to IA as explained above. Then, if an egress token is available, which is normally always the case, packet may be forwarded right away to the egress adapter (770) and SM buffer released. A lack of tokens could result of a malfunction or congestion of egress adapter. Especially, a downward device, to which egress adapter is attached, may not be ready and prevent egress adapter from sending traffic normally (flow control). Another reason for a lack of tokens would be that actual RTT is larger than what has been accounted for in the design of the switch fabric hence, tokens (and requests and acknowledgments) may need more time to circulate through cables and wiring of a particular implementation of one or more ports. In this case switch fabric is under utilized by those ports since wait states are introduced due to a lack of token and because acknowledgments do not return on time.

It must also be pointed out that, because the request selection algorithm of switch core authorizes several acknowledgments for a same egress port be sent back to IA's, several packets are eventually received for a same egress port in a same packet cycle. Obviously, packets stored in SM, must wait in line until they can be forwarded to egress adapter, in subsequent cycles, consuming one egress token each time. Hence, as long as request selection algorithm can manage to send back to IA's one acknowledgment per egress port at each packet cycle, switch core never later receive more than one packet per destination in SM. If tokens are normally available packets are immediately forwarded to egress adapter and stay in SM for one packet cycle only.

Once in egress adapter packets to forward are selected against any appropriate algorithm depending on the application. Egress tokens are returned to switch core when packets leave the egress buffer (780).

Figure 8:
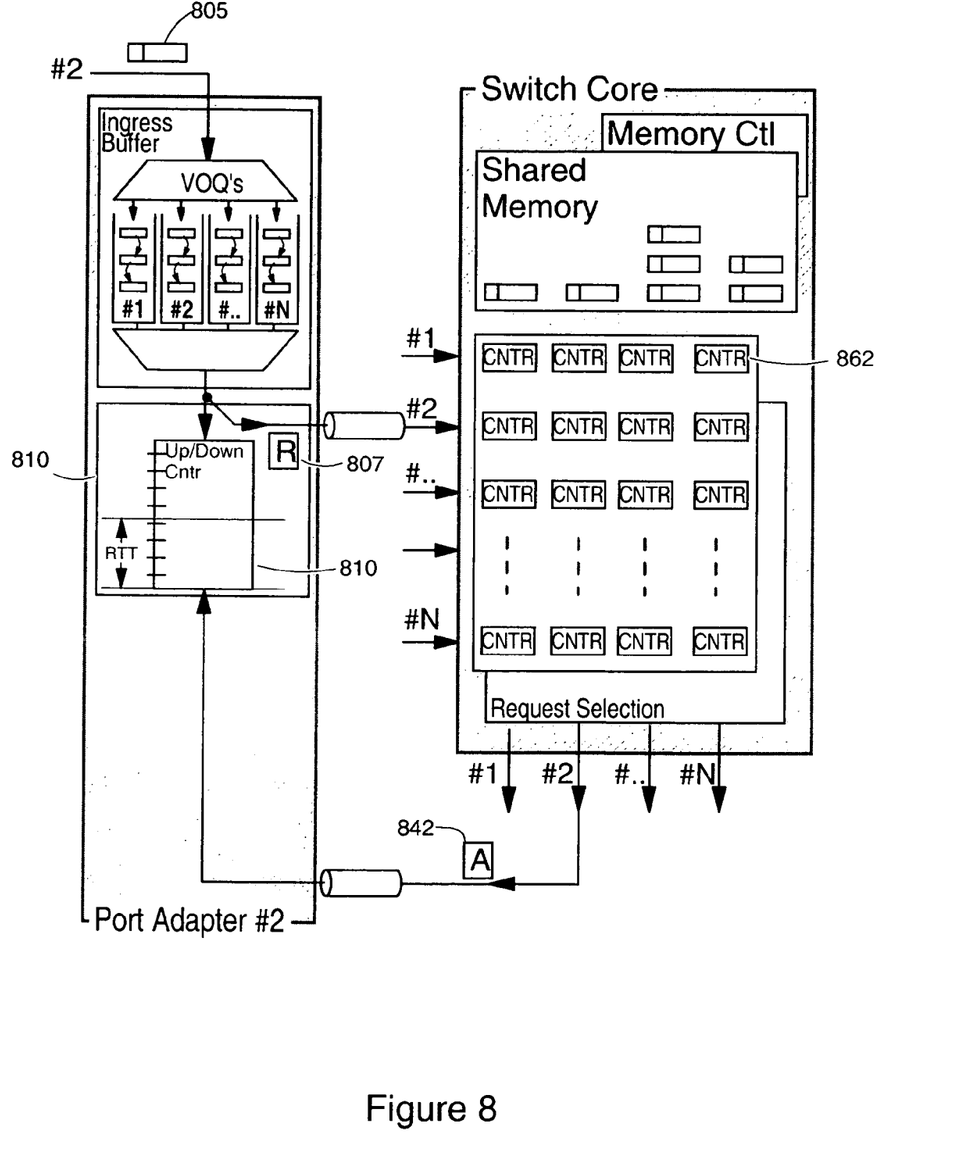
FIG. 8 discusses an alternate implementation of collapsed virtual output queuing array of counters.

FIG. 8 discusses an alternate implementation of cVOQ array of counters.

In order to further limit the hardware necessary to implement the switch core function of the invention one may want to reduce the size of the counters to what is strictly necessary since many of them have to be used. Typically, a cVOQ array of a 64-port switch, with 8 classes of service, must implement 64×64×8=32768 individual counters. Saving on counter size is thus multiplied by this number.

On the contrary of the assumption used up to this point of the description which assumes that an unlimited number of requests (i.e., up to the size of ingress buffers) can be forwarded to switch core, size of cVOQ counters can be made lower than what largest ingress buffer can actually hold. Indeed, they can be limited to count RTT packets provided there is the appropriate logic, in each egress adapter, to prevent the forwarding of too many requests to switch core. In other words, IA's can be adapted so as to forward only up to RTT requests while seeing no acknowledgment coming back from switch core. Obviously, the requests in excess of RTT must be queued in each IA and delivered later when count of packets in corresponding cVOQ counter has, for sure, a value less than RTT thus, can be incremented again. This is the case whenever an acknowledgment is returned from switch core for a given queue. Hence, to limit the hardware required by switch core, a logic mechanism must be added in each IA to retain the request in excess of RTT. This complication in the mode of operation of a switch fabric according to the invention may be justified for practical considerations e.g., in order to limit the overall quantity of logic needed for implementing a core and/or to reduce the power dissipation of the ASIC (application specific integrated circuit) generally used to implement this kind of function.

As a consequence, each individual counter (862) of a cVOQ array can be e.g., a 4-bit counter if RTT is lower than 16 packet-times (so that counter can count in a 0-15 range). Hence, each IA must have the necessary logic (810) to retain the requests in excess of RTT on a per queue basis (thus, per individual counter). Thus, there is e.g., an up/down counter to count the difference between the number of received packets (805) minus the number of returned acknowledgments (842). If the difference stays below RTT, requests can be immediately forwarded as in preceding description. However, if level is above RTT, sending of one request (807) is contingent to the return of one acknowledgment (842) which is the guarantee that counter can be incremented.

Therefore, in this alternate implementation of the invention counter counting capability is shared between the individual counters of the switch core and the corresponding counters of the IA's.

As an extreme case of the above implementation switch core counters (862) can further be reduced to a single latch or flip-flop which, when on, means there is at least one packet waiting in the corresponding IA queue. Therefore, instead of forwarding requests, IA's must send set and reset commands respectively issued, only once, when one packet is received while a queue was empty and when last packet of a queue is forwarded. Obviously, acknowledgments continue to be sent back to IA queues at each packet cycle, as selected by selection algorithm now operating from a binary array of on and off bits, so as IA logic (810) and up/down counter can continue to operate as explained above. Obviously, in this last mode of operation, since there is a delay to propagate a reset command to switch core, it may well happen that one or more acknowledgments be sent back to an IA while there is no longer any waiting packet. In this case acknowledgments are just ignored.

What is claimed is:

1. A method for switching data packets in a shared-memory switch core:
providing in said shared-memory switch core a collapsed virtual output queuing array with elements of said array corresponding to virtual output queues;
updating, in said switch core, the collapsed virtual output queuing array upon reception of transmission requests;
determining whether there is enough room in the shared memory switch core to store at least one data packet;
determining whether an egress port adapter to which the at least one data packet is destined has sufficient available memory to receive at least one data packet;
selecting one virtual output queue holding at least one data packet, wherein said selecting is performed only if: (a) there is enough room in the shared memory switch core, and (b) the egress port adapter has sufficient available memory to receive at least one data packet;
updating said collapsed virtual output queuing array according to said virtual output queue selection;
transmitting an acknowledgment to said selected virtual output queue; and
forwarding a received data packet of the at least one data packet to said egress port adapter, wherein said forwarding further comprises:
determining an availability of space in a relevant egress port adapter, wherein the space available in an egress port adapter is determined according to a counter associated to said egress port adapter, said counter being decremented when a data packet is forwarded to said egress port adapter and incremented upon reception of a token returned from said egress port adapter for each space becoming available; and
if there is available space, transmitting immediately said received data packet to said relevant egress port adapter;
else, holding said received data packet in said shared memory switch core until space becomes available in said relevant egress port adapter.

2. The method of claim 1 wherein said collapsed virtual output queuing array comprises a plurality of counters, one counter being associated to each of said virtual output queue, the counter value characterizing the number of data packets held in the corresponding virtual output queue.

3. The method of claim 2 wherein updating said collapsed virtual output queuing array further comprises incrementing by one the counter associated to the virtual output queue from which a request is received and decrementing by one the counters associated to said selected virtual output queues to which an acknowledgment is issued.

4. The method of claim 1 wherein said collapsed virtual output queuing array is made of counters, a size of which matches a size of ingress buffer operably coupled to said switch core.

5. The method of claim 1 wherein said collapsed virtual output queuing array is made of counters, a size of which is limited to count Round Trip Time (RTT) requests and wherein each of said counter has a counterpart in a corresponding ingress port adapter.

6. The method of claim 5 wherein size of said counters is further limited to one bit and wherein said requests are replaced by a set and a reset commands issued whenever, respectively, a queue is no longer empty and is becoming empty.

7. The method according to claim 1 wherein each of said requests includes the egress port destination of the corresponding data packet.

8. The method according to claim 1 wherein commands are encoded within a data packet.

9. An apparatus comprising a switch core including a plurality of input ports;
a plurality of output ports;
a shared memory to store packets ingressing on at least one of the input ports and egressing from at least one of the output ports;
memory controller operably coupled to the shared memory;
a collapsed virtual output queuing array wherein each element of the array corresponds to a virtual output queue; and
a switch controller executing an algorithm upon receiving at least one request signal and issuing at least one acknowledgment signal based upon state of at least one selective element within said array, wherein issuing said acknowledgement signal is performed only if: (a) there is enough room in the shared memory, and (b) an egress port adapter has sufficient available memory to receive a data packet;
wherein the switch controller further forwarding a received data packet to said egress port adapter, wherein said forwarding further includes:
determining an availability of space in a relevant egress port adapter, wherein the space available in an egress port adapter is determined according to a counter associated to said egress port adapter, said counter being decremented when a data packet is forwarded to said egress port adapter and incremented upon reception of a token returned from said egress port adapter for each space becoming available; and
if there is available space, transmitting immediately said received data packet to said relevant egress port adapter;
else, holding said received data packet in said shared memory switch core until space becomes available in said relevant egress port adapter.

10. The apparatus of claim 9 wherein the shared-memory size is first determined according to the round trip time of the flow control information and the number of ports of said switch core.

11. The apparatus of claim 9 wherein the shared-memory size is further determined by the choice of said algorithm to select said acknowledgments returned to said ingress port adapters.

12. The apparatus according to claim 11 wherein said selection algorithm is iSLIP.

13. The apparatus of claim 9 wherein size of said egress buffer is solely determined by the round trip time of the flow control information.

14. The apparatus of claim 9 wherein commands include request, acknowledge, token, set or reset.

15. The apparatus of claim 9 further including input port adapters operably coupled to the switch core.

16. The apparatus of claim 15 further including at least one egress buffer operably coupled to the switch core.

17. The apparatus of claim 9 wherein the collapsed virtual output queue array includes a plurality of counters.

18. A method for switching data packets in a shared-memory switch core comprising:
providing, in said switch core, an array of counters wherein each counter of the array corresponds to a virtual output queue;
adjusting a value of at least one counter upon receiving request signals;

executing an algorithm which examines outstanding request signals and selecting one;

issuing from said algorithm an acknowledgment signal based upon the selected request signal, wherein issuing said acknowledgement signal is performed only if: (a) there is enough room in the shared memory, and (b) an egress port adapter has sufficient available memory to receive a data packet;

adjusting contents of a counter linked to the acknowledgment signal;

receiving, in said switch core, a data packet; and forwarding the received data packet to selected egress port having sufficient space to accommodate said received data packet, wherein said forwarding further includes:

determining an availability of space in a relevant egress port adapter, wherein the space available in an egress port adapter is determined according to a counter associated to said egress port adapter, said counter being decremented when a data packet is forwarded to said egress port adapter and incremented upon reception of a token returned from said egress port adapter for each space becoming available; and if there is available space, transmitting immediately said received data packet to said relevant egress port adapter;

else, holding said received data packet in said shared memory switch core until space becomes available in said relevant egress port adapter.

* * * * *